United States Patent
Taglang et al.

(10) Patent No.: US 8,146,467 B2
(45) Date of Patent: Apr. 3, 2012

(54) ELECTRICAL STRESSING MEANS

(75) Inventors: Johann Taglang, Medlingen (DE); Thorsten Kusnik, Baechingen (DE)

(73) Assignee: ROEHM GmbH, Sontheim (DE)

( * ) Notice: Subject to any disclaimer, the term of this patent is extended or adjusted under 35 U.S.C. 154(b) by 324 days.

(21) Appl. No.: 12/447,309

(22) PCT Filed: Oct. 24, 2007

(86) PCT No.: PCT/DE2007/001893
§ 371 (c)(1),
(2), (4) Date: Dec. 14, 2009

(87) PCT Pub. No.: WO2008/052513
PCT Pub. Date: May 8, 2008

(65) Prior Publication Data
US 2010/0072713 A1     Mar. 25, 2010

(30) Foreign Application Priority Data
Oct. 28, 2006 (DE) .......................... 10 2006 050 918

(51) Int. Cl.
*B23B 31/28* (2006.01)
*B23B 13/00* (2006.01)

(52) U.S. Cl. ......................................... 82/165; 279/110

(58) Field of Classification Search .................... 82/168, 82/167, 145, 131, 165, 142, 143; 279/110, 279/134, 123; 408/240, 238
See application file for complete search history.

(56) References Cited

U.S. PATENT DOCUMENTS

| 3,752,019 | A | * | 8/1973 | Kaneko | 82/142 |
|---|---|---|---|---|---|
| 4,414,871 | A | * | 11/1983 | Trout | 82/165 |
| 4,573,379 | A | * | 3/1986 | Bald | 82/145 |
| 4,624,159 | A | * | 11/1986 | Kumer et al. | 82/19 |
| 5,095,785 | A | | 3/1992 | Noggle | 82/1.2 |
| 6,079,303 | A | | 6/2000 | Lyachovitsky | 82/165 |
| 6,139,028 | A | * | 10/2000 | Kosho | 279/114 |
| 6,186,515 | B1 | | 2/2001 | Roehm | 279/4.01 |

FOREIGN PATENT DOCUMENTS
DE            10120939           10/2002
* cited by examiner

*Primary Examiner* — Will Fridie, Jr.
(74) *Attorney, Agent, or Firm* — Andrew Wilford

(57) ABSTRACT

The invention relates to an electrical stressing means having a housing (2) which can be attached to the drive spindle of a machine tool and in which a threaded rod (3) for adjustment of the clamping jaws of a chuck is mounted such that it can be moved axially, and having an electric actuating motor (4), whose rotor is connected for drive purposes to a drive wheel (6). The drive wheel (6) is connected to the shaft generator (7) of a harmonic drive, and the internal gearwheel (8) of the harmonic drive is connected to the housing (2), with the steel bush (9) (flexspline), which has an external tooth system, of the harmonic drive being provided as a drive for the spindle nut associated with the threaded rod (3).

18 Claims, 5 Drawing Sheets

ELECTRICAL STRESSING MEANS

CROSS REFERENCE TO RELATED APPLICATIONS

Figure 1:
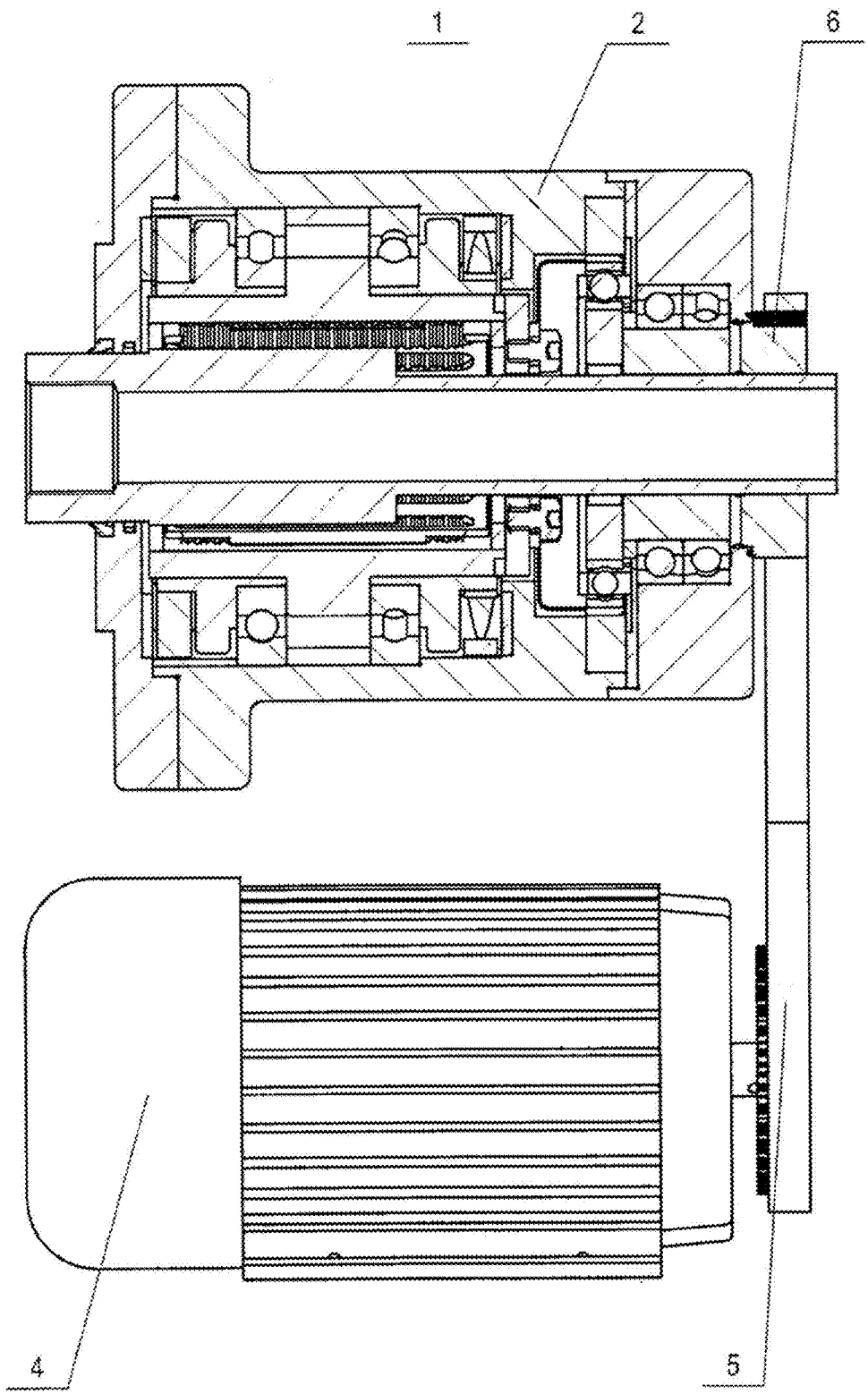

This application is the U.S. national phase of PCT application PCT/DE2007/001893, filed 24 Oct. 2007, published 8 May 2008 as WO2008/052513, and claiming the priority of German patent application 102006050918.8 itself filed 28 Oct. 2006, whose entire disclosures are herewith incorporated by reference.

The invention relates to an electric actuator having a housing that can be attached to the drive spindle of a machine tool, in which a threaded rod is mounted for moving the jaws of a chuck, and having an electric actuating motor, whose rotor is connected for drive purposes to a drive wheel.

Currently actuating cylinders serve in practice for activating the jaws of a chuck arranged on a machine tool, such as are known from, for example, DE 198 23 823 [U.S. Pat. No. 6,18,515] by the applicant. The actuating cylinders are operated hydraulically in order to convert axial movement of a piston connected to a tie rod into radial movement of the jaws in the chuck.

The conventional hydraulically operated pivotal actuating cylinders are mounted either directly on a machine table or in an actuator and they rotate with and maintain tension force in the drive spindle. In case of tension is no longer applied, the tension is maintained over a certain period of time via safety valves. However, the actuating cylinders may not be positioned with high accuracy, and the actuating forces may not be adjusted with high accuracy such that the usability of the actuating cylinders as automatically adjustable bracing devices is limited.

Efforts are described in prior art, such as in DE 32 18 83 [U.S. Pat. No. 4,573,379], to replace such hydraulically operated actuating cylinders by an electric actuator, the adjustment of the tie rods not being produced by a pressurized fluid but by means of an electric motor. The electric actuators have not yet been proven in practice, and exist only as prototypes, since they must have be very complexly constructed in order to maintain the actuation force required in each system. Another disadvantage is that a much greater energy expense is usually necessary in the known electric actuators.

Electromechanically operated grippers are further described in prior art, such as in DE 101 20 939, that have the disadvantage of only being able to exert modest clamping forces. In case of power failure the tension is released.

Furthermore, electromagnetic chucks are known that also have the disadvantage of lower holding forces, and in which the tension force is also not maintained on power failure. Also, the magnetic actuator attracts metal shavings and metal dust when in operation, causing problems with the positioning, or even pressing the particles into the workpiece.

The object of the invention is therefore to further improve an electric actuator of the type described above such that axial tension may be created in drive spindle by means of a direct electric connection in a simple manner, while ensuring an adjustability of the tension force even when the spindle is rotating.

The object is solved according to the invention in an electric actuator of the type mentioned above in that the drive wheel is connected to a wave generator of a harmonic drive and a circular spline of the harmonic drive is connected to the housing and that an externally toothed flexspline is provided as drive element for a spindle nut associated with the threaded rod.

Such an electric actuator has some remarkable advantages. The small torque created by the actuating motor at a high rotational speed is converted into a low rotational speed and a high torque on the spindle nut due to the translation in the harmonic drive. A conversion ratio of 20:1 to 200:1 in the harmonic drive has proven particularly advantageous.

Since the circular spline is solidly mounted on the housing, the externally toothed flexspline rotates oppositely to the drive spindle and to the actuating motor as the drive for the spindle nut. It thus moves the threaded rod axially back and forth and tightens or loosens the chuck. If the drive spindle operates at the drive rotational speed the electric actuator moves along at the same rotational speed, since the housing is mounted to the drive spindle. This also means that the drive wheel and therefore also the rotor of the actuating motor move along at the same rotational speed of the drive spindle. Since the actuating motor is rated for very high rotational speeds, it generates only a low amount of current at comparatively low rotational speeds of the drive spindle such that the low torque has no influence on the drive spindle. However, the low torque also causes a prestressing in the chuck due to the reversing of the movement direction of the spindle nut.

In case of power failure the torque of the actuating motor is utilized for braking rotation of the drive spindle such that reversing of the rotation relative to the spindle nut of the torque is available for the safe loading of the chuck until the drive spindle slows to a stop.

In order to obtain a short construction length of the electric actuator, the invention further provides that the electric motor is mounted on the side next to the housing, the electric motor being preferably connected to the drive wheel via a belt drive; however, any other connection, such as via toothed gears, is also feasible.

Furthermore, it is also within the scope of the invention that an externally toothed flexspline is coupled to the spindle nut via a claw coupling that may be have some play in order to jar opening chucks having a self-locking mechanism.

As an alternative the externally toothed flexspline may be rigidly coupled to the spindle nut, thus achieving high positional accuracy.

It is particularly preferred within the scope of the invention that the spindle nut part of a recirculating-ball drive in order to ensure reliable adjustment of the threaded rod.

It is also preferred if a cover of the housing is provided for connection to a frame of the machine tool in order to thus unburden the mount of the drive spindle and in order to avoid an effect on the connection of the actuating motor to the drive spindle via the belt drive.

An advantageous embodiment of the electric actuator has a shunt that can short-circuit the electric motor in case of power failure. In this manner the torque of the electric motor is available for braking rotation of the drive spindle.

Preferably the electric motor in the actuator is a step motor that has the advantage that the motor controller may be also serve as a detector for the loading of the jaws. In this manner extensive detecting systems can be omitted and the controller of the step motor may also be serve as a position detector of the setting of the jaws, by means of which the positions of the jaws becomes freely programmable from the controller.

As an alternative the electric motor in the electrical actuator may also be a servomotor. The servomotor is preferably rated for rotational speeds of up to 6500 rpm, thus enabling a particularly quick operation.

In a further advantageous embodiment of the electrical actuator at least one sensor is arranged in at least one jaw for detecting the tension therein such that the tension may be detected exactly during operation and can be better readjusted or selectively modified by means of the fine adjustability of the electric motor, whereas an expensive controllable valve is required for this purpose in a hydraulic system.

In a further preferred embodiment of the electrical actuator having its own controller the influence of the rotation-speed-dependent centrifugal force in particular may be reduced, or compensated in this manner, in that the tie rods are selectively adjusted.

Preferably a control cam is incorporated in the threaded rod in the electrical actuator that moves along a pin such that use as a pivoting actuator is also possible.

Furthermore, the electrical actuator may also be mounted, for example, on a machine tool table or on a device base plate.

The electrical actuator according to the present invention may be used particularly in grippers, robots, or manipulators having such grippers, or in machine tools.

Overall the advantage of the electrical actuator according to the invention is a low expenditure of energy for maintaining the voltage and for loading the chuck, since the actuating process may be realized even in actuating motors having a small output, in this case, for example, 600 W for a 25000 N tension or pressure force. As another example a step motor may realize a tension or a pressure force of 18 kN at a voltage of 120 V and a torque of 2.2 Nm. Accordingly the overall efficiency of the electrical energy resulting in tension or pressure forces may be approximately 40 percent.

Since the electrical actuator rotates along with the is drive spindle, the stress of the bearings used is very low, and they are further subjected to only modest heating by the electrical actuator. In other words, the stress on the bearings used is very low, because the main loads are considered static. Since the heat generated in the bearings and in the entire electrical actuator is low the influence on the workpieces is also omitted.

Tightening of the workpiece may occur in a bracing device in connection with the electrical actuator via the controller, whereby reproducible positioning at an accuracy of up to 2 μm is possible in the bracing device depending on the drive layout. Therefore, in combination with the bracing device the electrical actuator enables a cost-effective possibility for detecting and controlling the position of a workpiece, thus improving processing.

In the embodiments of the present invention the figures illustrate a recirculating-ball drive as the drive, however, other transmissions may also be used. A recirculating-ball drive has a high load-free return torque as a result of its construction. This gives a self-locking effect up to three times as great as the tension or pressure force during reverse operation of the threaded drive. In this manner the force is stored by the combination of both components.

Furthermore, safety is improved due to the self-locking action of the electrical actuator in comparison with a hydraulic or a pneumatic system.

A further advantage is that compared to a hydraulic or a pneumatic system the number of components is lower, wherein most of the components are standard components such that the production costs are reduced. Particularly actuators may be produced in a very cost-effective manner by use of such an electrical actuator, if it is produced in limited-lot productions.

The space requirement of the hydraulic unit is much more than that of the electrical actuator. Also, the more compact construction results in a lower weight, thus resulting in less stress on the manipulators and the robot.

Figure 2:
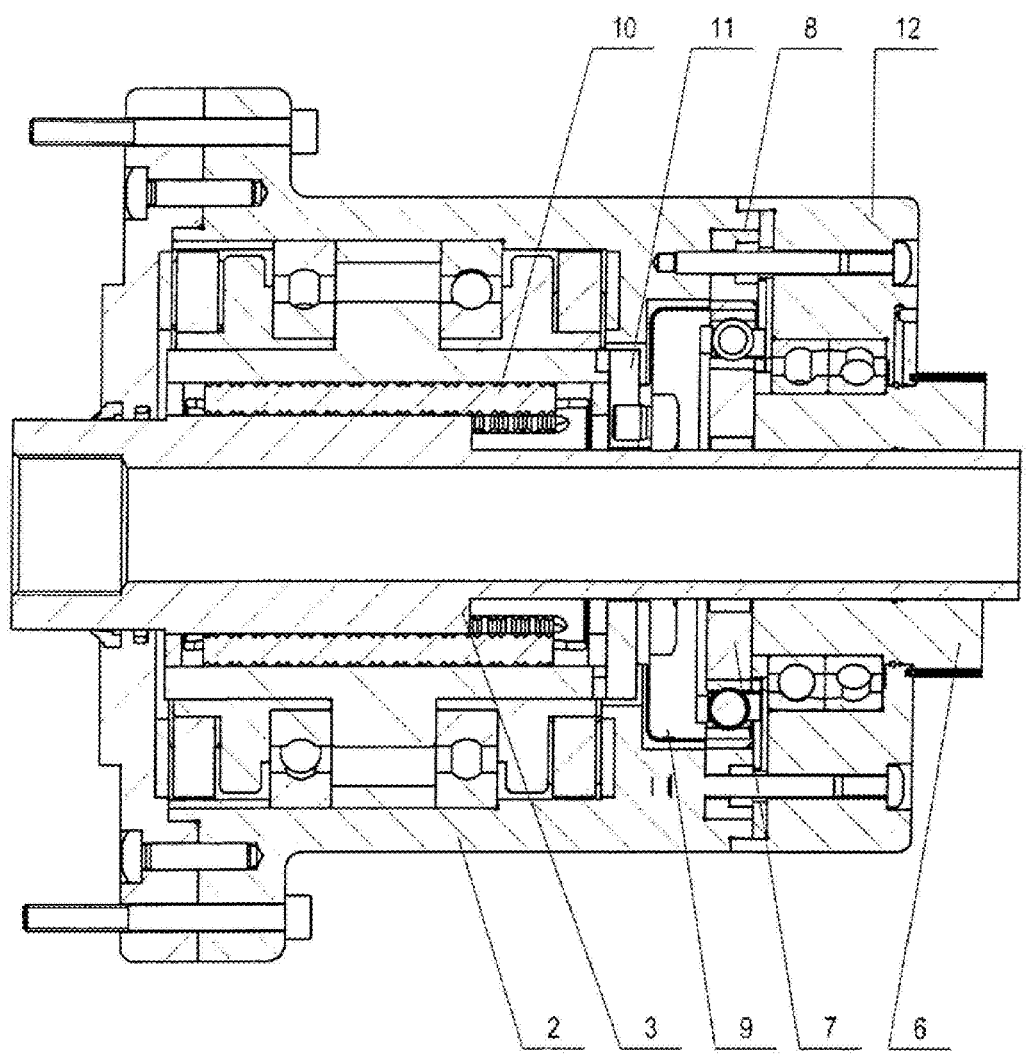
Figure 3:
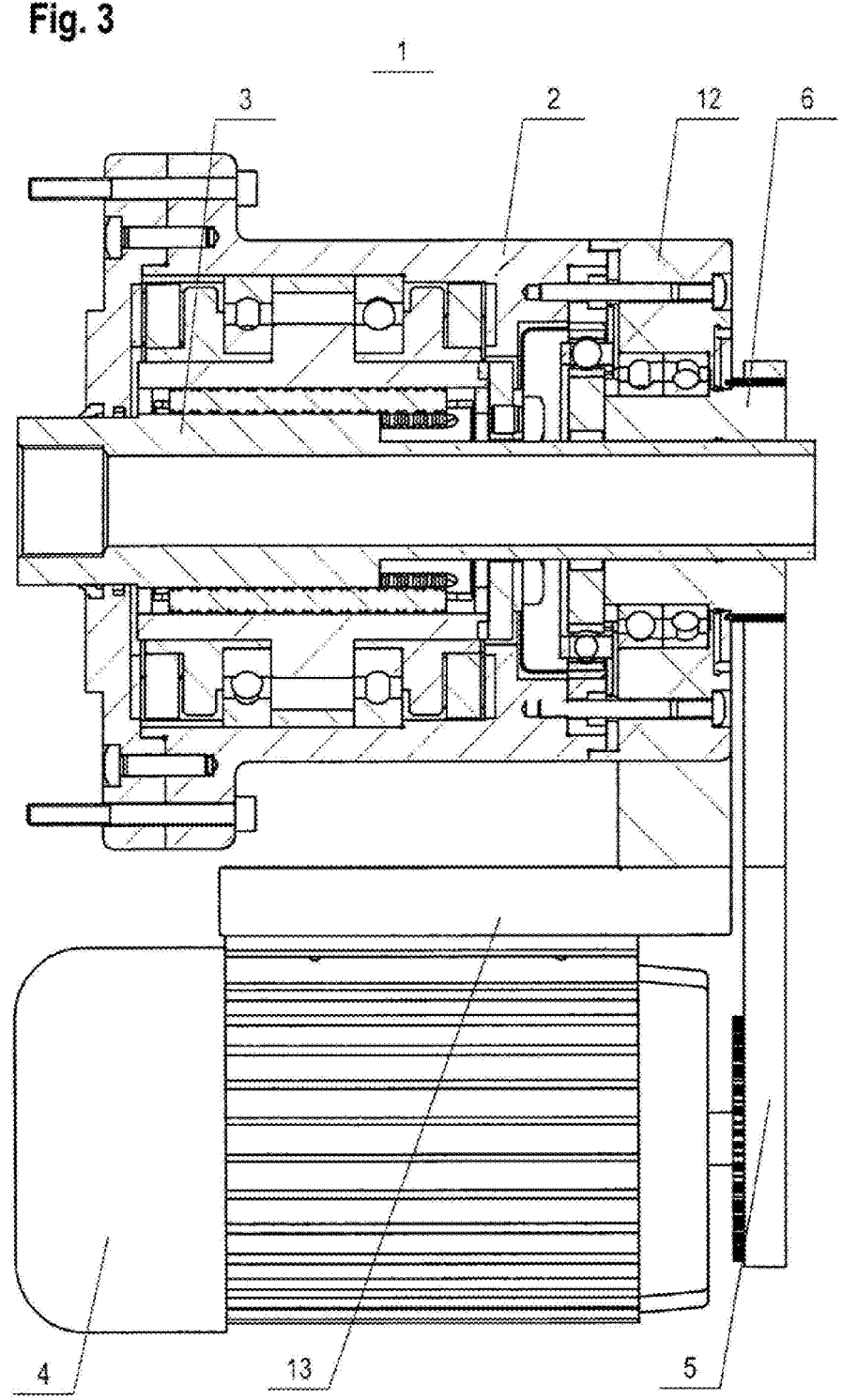
Figure 4:
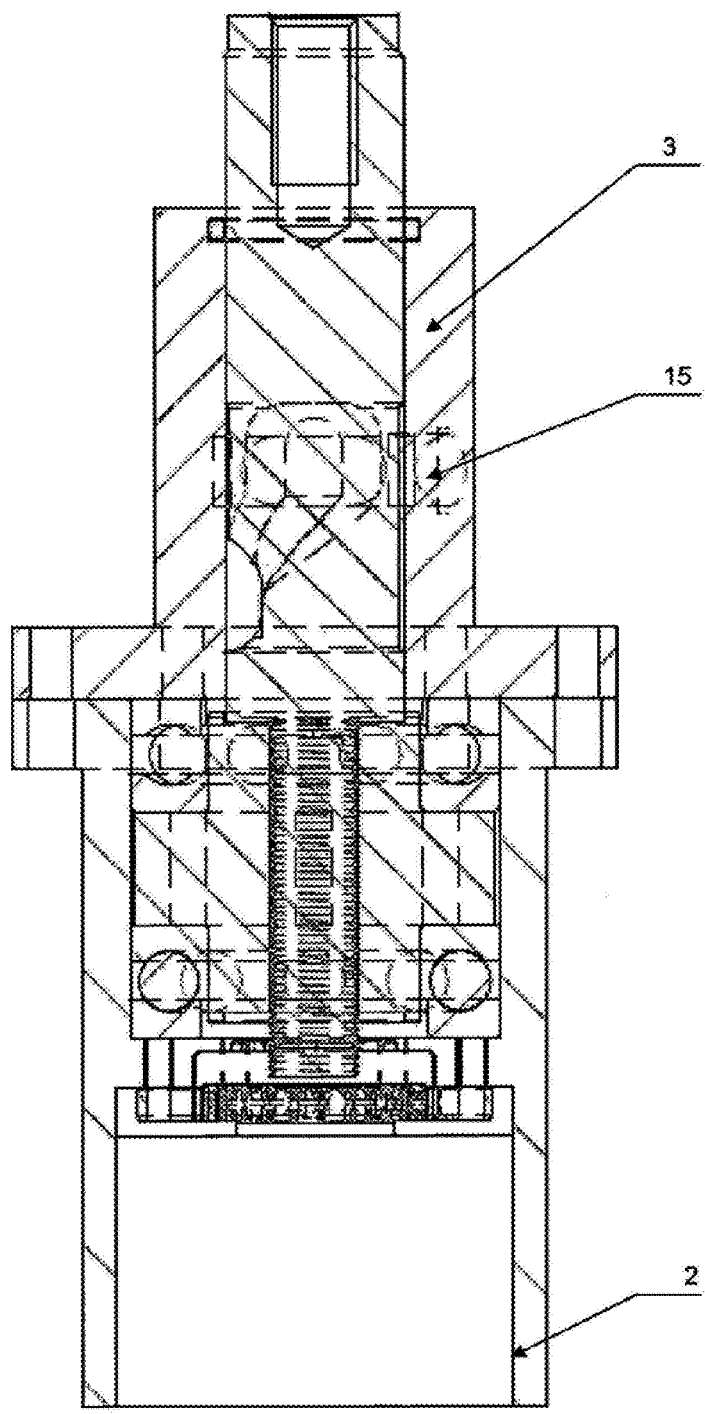
Figure 5:
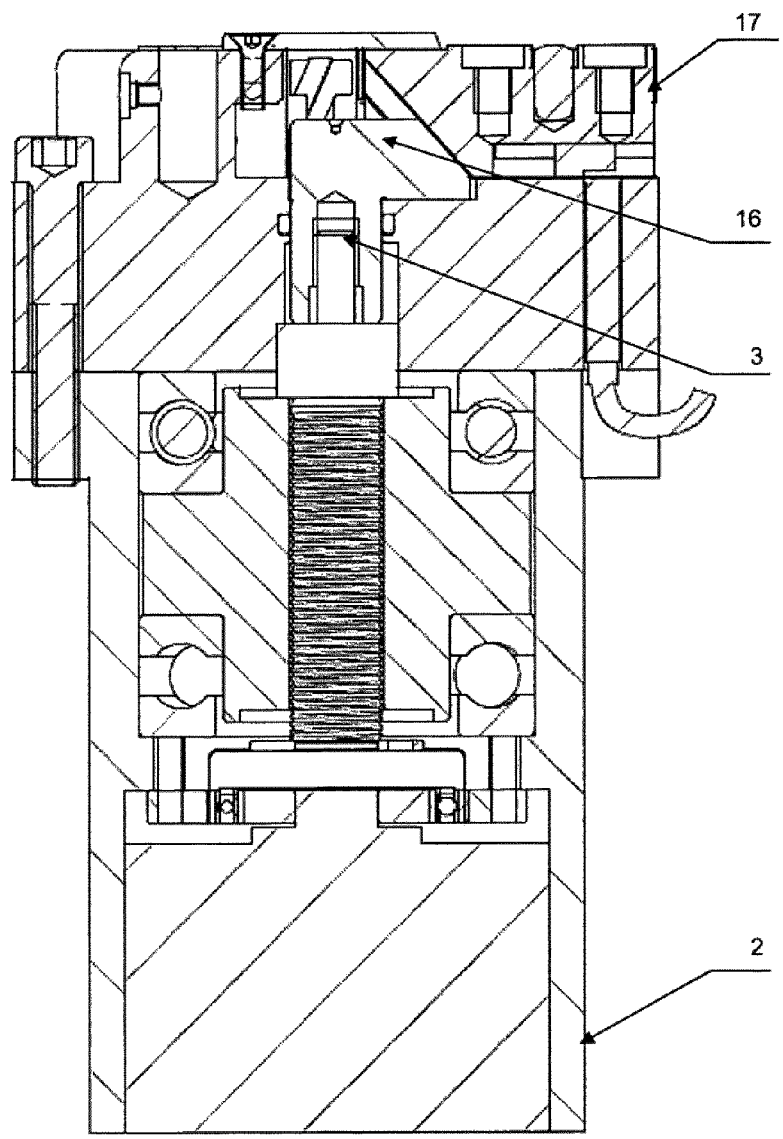

The invention is explained in further detail below based on the embodiments shown in the drawings; therein:

FIG. 1 is a side view, partially in section of an electrical actuator according to the invention, FIG. 2 is a longitudinal section through the electrical actuator, shown unconnected to the actuating motor, FIG. 3 is a view like FIG. 1 of the housing of the electrical actuator connected to the frame of the machine tool, FIG. 4 is a side sectional view of another embodiment of the electrical actuator according to the invention for an machine-tool actuator or bracing device, and FIG. 5 is a sectional side view of another embodiment of the electrical actuator according to the invention for grippers in robots or manipulators.

The drawing shows an electrical actuator 1 that is used to position the jaws of a chuck mounted on a machine tool, and to permanently and safely tension them against the workpiece or tool when actuated. To this end the electrical actuator 1 has a housing 2 mounted on the drive spindle of a machine tool and in which a threaded rod 3 is axially shiftable for positioning the jaws of the chuck. The electrical actuator 1 further comprises an electric actuating motor 4 mounted on the side next to the housing 2 and connected to a drive wheel 6 via a belt drive 5, the drive wheel being connected to the rotor of the actuating motor 4 so it can be driven thereby. The electrical actuator 1 is particularly effective because the drive wheel 6 is connected to the shaft of a wave generator 7 of a harmonic drive, and the circular spline 8 of the harmonic drive is connected to the housing 2, and that the flexspline 9 of the harmonic drive having external teeth is provided as the drive for the threaded rod 3, that is to say via a recirculating-ball drive 10 in the embodiment shown in the drawing, which, of course, may also be embodied as a threaded ball drive or simply as a spindle nut.

The flexspline 9 with an array of external teeth is connected to the recirculating-ball drive 10 via a claw coupling 11 having some play.

FIG. 3 shows an embodiment in which a cover 12 of the housing 2 is mounted on a frame 13 of the machine tool such that the bearing of the drive spindle is not influenced by the presence of the actuating motor 4.

FIG. 4 shows a further embodiment of the electrical actuator 1, embodied as an actuator for operating elements of machine tools or as a bracing device. The electric motor 4 comprises a stepping or servomotor rated for rotational speeds of up to 5000 rpm. The motor serves as a control member for tension and as a drive for axial adjustment and may be connected to a flange nut via a drive.

The electrical actuator 1, for example, is provided on a machine tool table or on a base plate. A recirculating-ball drive is shown as the drive in FIG. 4, however, other drives may also be used. As shown in FIG. 4, a rotor is coupled to the wave generator, wherein the transmission ration is 20:1 to 200:1.

The low torque and the high rotational speed of the motor are converted into a large torque and a low rotational speed. Since the circular spline of the recirculating-ball drive is firmly connected to the housing 2, the flexspline 9 with its array of external teeth operates in the reverse rotational direction to the electric motor as the drive for the recirculating-ball drive (or threaded ball drive). It moves the threaded rod 3 in axial in either direction, and tensions or releases a jaw mounted on the spindle.

The level of tension can be selectively readjusted or adjusted during processing of workpieces by control of the electric motor. In a bracing device in combination with the electrical actuator readjustment of the workpiece can be carried out via the machine controller.

In case of power failure the motor is short-circuited via an unillustrated bridge or fuse. In this manner the torque of the motor is available for braking rotation of the drive spindle.

The bracing device may be reproducibly positioned at an accuracy of up to 2 μm depending on the drive.

Due to the construction thereof the recirculating-ball drive has a high load-free return torque. On reverse operation of the threaded drive this causes a self-locking action of up to twice the tensile force or of the pressure force. In this manner tension is stored by the combination of two components.

The coupling between the motor and the drive may have some play by means of which opening of chucks having a self-locking mechanism is facilitated with the impact.

As an alternative the connection may be rigid in order to ensure high accuracy.

A control cam 15 in the threaded rod 3 enables the use as a pivoting actuator, the control cam 15 being formed to move along a pin.

FIG. 5 shows a further embodiment of the electrical actuator for chucks, or grippers for robots and manipulators and may also be used along with an HSK adapter on the machine tool spindle as a manipulator.

In this embodiment the electric motor is a step or servomotor rated for rotational speeds of up to 6500 rpm. The motor serves as a control member for tensioning and as a drive for axial adjustment. The step motor has the advantage that the motor controller may be used simultaneously as a position detector for the tightness of the jaws. In this manner extensive position-generator systems may be omitted. Thus the positioning is also freely programmable from the controller.

The motor is connected to a flange nut via a drive. The gripper, for example, is attached to a robot or manipulator. As in the previous embodiments, other drives may also be used in addition to the recirculating-ball drive shown.

A rotor is coupled to the wave generator of the recirculating-ball drive having a translation of 20:1 to 200:1. The low torque and the high rotational speed of the motor are converted into a large torque and a low rotational speed. Since the circular spline of the recirculating-ball drive is firmly connected to the housing 2 of the electrical actuator 1, the flexspline 9 having an array of external teeth operates in the reverse rotational direction to the electric motor as the drive for the recirculating-ball drive (or the threaded ball drive). It moves the threaded rod 3 axially back and forth and actuates the jaws 17 via a spline jaw drive 16 that is connected to the threaded rod 3. The tension may be readjusted or selectively processed during processing via the motor controller.

In case of power failure the motor is short-circuited by means of a shunt that is not shown. In this manner the motor exerts torque against the reverse rotation of the roller track. The gripper may be reproducibly positioned at an accuracy of up to 5 μm depending on the drive layout.

Due to the construction thereof the recirculating-ball drive has a high load-free return torque. In the reverse operation of the threaded drive this causes a self-locking action of up to three times the tensile force or of the pressure force. In this manner the force is stored by the combination of both components.

In this embodiment the coupling between the motor and the drive may also have some play, by means of which opening is facilitated with the impact created in chucks having a self-locking mechanism. As an alternative the connection may also be rigid in order to ensure high accuracy.

The invention claimed is:

1. An electrical actuator comprising
   a housing that can be attached to the drive spindle of a machine tool;
   a threaded rod for moving the jaws of a chuck and movable axially in the housing;
   a nut threaded on the rod;
   an electric actuating motor having a rotor connected to a drive wheel; and
   a harmonic drive having a wave generator connected to the drive wheel, a circular spline connected to the housing, and an externally toothed flexspline operatively connected to the nut for rotation of the threaded rod by the electric motor.

2. The electrical actuator according to claim 1 wherein the harmonic drive has a translation of 20:1 to 200:1.

3. The electrical actuator according to claims 1 wherein the electric motor is mounted on the side next to the housing.

4. The electrical actuator according to claim 3 wherein the electric motor is connected to the drive wheel by a belt drive.

5. The electrical actuator according to claim 1 wherein the externally toothed flexspline is coupled to the spindle nut via a claw coupling.

6. The electrical actuator according to claim 5 wherein the claw coupling has play.

7. The electrical actuator according to one of the claims 1 wherein the flexspline is rigidly coupled to the spindle nut.

8. The electrical actuator according to one of the claims 1 wherein the spindle nut is part of a recirculating-ball drive.

9. The electrical actuator according to one of the claims 1 wherein a cover of the housing is provided for connection to a frame of the machine tool.

10. The electrical actuator according to claim 1, further comprising
    a shunt operable to short-circuit the electric motor in case of power failure.

11. The electrical actuator according to claim 1 wherein the electric motor is a step motor.

12. The electrical actuator according to claim 11, further comprising
    a controller of the step motor also serving as a position detector for the jaws.

13. The electrical actuator according to one of the claims 1 wherein the electric motor is a servomotor.

14. The electrical actuator according to claim 13 wherein the servomotor is rated for rotational speeds of up to 6500 rpm.

15. The electrical actuator according to claim 1, further comprising
    at least one sensor in at least one jaw for detecting tension force.

16. The electrical actuator according to claim 15, further comprising
    a controller for detecting positions of the jaws depending on an output of the sensor.

17. The electrical actuator according to claim 1, further comprising
    a control cam moving along the pin and incorporated into the threaded rod.

18. The electrical actuator according to claim 1 wherein the jaws can be activated by a spline jaw drive connected to the threaded rod.

* * * * *